United States Patent
Bangolae et al.

(10) Patent No.: US 9,681,354 B2
(45) Date of Patent: Jun. 13, 2017

(54) SIGNALING RADIO BEARER OPTIMIZATIONS AND OTHER TECHNIQUES FOR SUPPORTING SMALL DATA TRANSMISSIONS

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Puneet Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/318,008

(22) Filed: Jun. 27, 2014

(65) Prior Publication Data

US 2015/0043449 A1   Feb. 12, 2015

Related U.S. Application Data

(60) Provisional application No. 61/863,902, filed on Aug. 8, 2013.

(51) Int. Cl.
*H04B 7/06* (2006.01)
*H04W 36/32* (2009.01)
(Continued)

(52) U.S. Cl.
CPC ........ *H04W 36/32* (2013.01); *E04G 23/0218* (2013.01); *E04H 9/025* (2013.01);
(Continued)

(58) Field of Classification Search
None
See application file for complete search history.

(56) References Cited

U.S. PATENT DOCUMENTS 5,754,638 A   5/1998   Kusunoki
7,474,686 B2   1/2009   Ho
(Continued)

FOREIGN PATENT DOCUMENTS

CN   103582006 A   2/2014
CN   105359059 A   2/2016
(Continued)

OTHER PUBLICATIONS

"U.S. Appl. No. 14/124,984, Preliminary Amendment filed Dec. 9, 2013", 11 pgs.
(Continued)

*Primary Examiner* — Kodzovi Acolatse
(74) *Attorney, Agent, or Firm* — Schwegman Lundberg & Woessner, P.A.

(57) ABSTRACT

Embodiments of an eNodeB and method for small data transfer in a Wireless Network are generally described herein. A method performed by circuitry of a User Equipment (UE) can include determining, by the UE, whether the UE is configured to be used for Machine Type Communication (MTC). The method can include determining whether the UE has small data (SD) to transfer. The method can include configuring the UE to use a small data signaling radio bearer (SDSRB) to send the SD, in response to determining that the UE is configured to be used for MTC and the UE has SD to transfer. An evolved Node B can determine whether the UE is configured to be used for MTC, determine whether there is SD to transfer to the UE, wherein SD comprises data that has delay tolerance, and configure the UE to use a signaling bearer to send the SD.

22 Claims, 5 Drawing Sheets

(51) Int. Cl.

| | |
|---|---|
| *H04L 5/14* | (2006.01) |
| *H04W 56/00* | (2009.01) |
| *H04W 4/00* | (2009.01) |
| *H04W 52/02* | (2009.01) |
| *H04W 76/04* | (2009.01) |
| *H04W 36/08* | (2009.01) |
| *H04W 72/08* | (2009.01) |
| *H04W 76/02* | (2009.01) |
| *H04W 36/28* | (2009.01) |
| *H04L 5/00* | (2006.01) |
| *H04W 24/10* | (2009.01) |
| *H04L 1/18* | (2006.01) |
| *E04G 23/02* | (2006.01) |
| *E04H 9/02* | (2006.01) |
| *H04W 16/26* | (2009.01) |
| *H04W 24/02* | (2009.01) |
| *H04W 48/16* | (2009.01) |
| *H04W 8/02* | (2009.01) |
| *H04W 72/04* | (2009.01) |
| *H04W 4/02* | (2009.01) |
| *H04W 36/14* | (2009.01) |
| *H04L 27/26* | (2006.01) |
| *H04W 88/08* | (2009.01) |
| *H04W 48/12* | (2009.01) |
| *H04W 74/08* | (2009.01) |
| *H04W 88/04* | (2009.01) |

(52) U.S. Cl.
CPC ......... *H04B 7/0617* (2013.01); *H04B 7/0626* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 8/02* (2013.01); *H04W 16/26* (2013.01); *H04W 24/02* (2013.01); *H04W 24/10* (2013.01); *H04W 36/08* (2013.01); *H04W 36/28* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 48/12* (2013.01); *H04W 72/0406* (2013.01); *H04W 72/0446* (2013.01); *H04W 74/0833* (2013.01); *H04W 88/04* (2013.01); *H04W 88/08* (2013.01); *Y02B 60/50* (2013.01)

(56) References Cited

U.S. PATENT DOCUMENTS

| | | | |
|---|---|---|---|
| 9,100,160 B2 | 8/2015 | Tarradell et al. | |
| 9,499,995 B2 | 11/2016 | Yakub et al. | |
| 2002/0045428 A1 | 4/2002 | Chesson | |
| 2006/0293061 A1 | 12/2006 | Kobayashi et al. | |
| 2007/0019578 A1 | 1/2007 | Meiri | |
| 2009/0016232 A1 | 1/2009 | Kwon et al. | |
| 2009/0122736 A1 | 5/2009 | Damnjanovic et al. | |
| 2009/0327395 A1 | 12/2009 | Park et al. | |
| 2010/0009675 A1 | 1/2010 | Wijting et al. | |
| 2010/0009690 A1 | 1/2010 | Jin et al. | |
| 2011/0080873 A1 | 4/2011 | Zhang et al. | |
| 2011/0199905 A1 | 8/2011 | Pinheiro et al. | |
| 2011/0250892 A1 | 10/2011 | Gupta et al. | |
| 2011/0268006 A1 | 11/2011 | Koskela et al. | |
| 2011/0274040 A1 | 11/2011 | Pani et al. | |
| 2012/0039321 A1 | 2/2012 | Ghosh et al. | |
| 2012/0057476 A1 | 3/2012 | Chan et al. | |
| 2012/0087247 A1 | 4/2012 | Min et al. | |
| 2012/0106517 A1 | 5/2012 | Charbit et al. | |
| 2012/0113934 A1 | 5/2012 | Ko et al. | |
| 2012/0163311 A1* | 6/2012 | Park | H04W 72/1294 370/329 |
| 2012/0184306 A1 | 7/2012 | Zou et al. | |
| 2012/0207073 A1 | 8/2012 | Kim et al. | |
| 2012/0243431 A1 | 9/2012 | Chen et al. | |
| 2012/0249372 A1 | 10/2012 | Jovicic et al. | |
| 2012/0270584 A1 | 10/2012 | Liang et al. | |
| 2012/0275365 A1 | 11/2012 | Anderson et al. | |
| 2012/0275366 A1 | 11/2012 | Anderson et al. | |
| 2012/0309419 A1 | 12/2012 | Lee et al. | |
| 2013/0017779 A1* | 1/2013 | Song | H04W 76/005 455/39 |
| 2013/0028235 A1 | 1/2013 | Barrett | |
| 2013/0044623 A1* | 2/2013 | Speight | H04B 7/15528 370/252 |
| 2013/0058306 A1 | 3/2013 | Noh et al. | |
| 2013/0077484 A1* | 3/2013 | Zhao | H04W 4/005 370/230 |
| 2013/0077594 A1 | 3/2013 | Park et al. | |
| 2013/0080597 A1* | 3/2013 | Liao | H04W 4/005 709/219 |
| 2013/0170347 A1* | 7/2013 | Zhang | H04L 47/808 370/230 |
| 2013/0194941 A1 | 8/2013 | Lu et al. | |
| 2013/0195026 A1 | 8/2013 | Johnsson et al. | |
| 2013/0223356 A1 | 8/2013 | Khoshnevis et al. | |
| 2013/0230035 A1 | 9/2013 | Grandhi et al. | |
| 2013/0288608 A1 | 10/2013 | Fwu et al. | |
| 2013/0294399 A1 | 11/2013 | Lee | |
| 2013/0301492 A1 | 11/2013 | Ji et al. | |
| 2013/0310100 A1 | 11/2013 | Lee et al. | |
| 2013/0322276 A1 | 12/2013 | Pelletier et al. | |
| 2014/0003262 A1 | 1/2014 | He et al. | |
| 2014/0003348 A1 | 1/2014 | Velev et al. | |
| 2014/0010179 A1* | 1/2014 | Lee | H04W 72/0406 370/329 |
| 2014/0016614 A1* | 1/2014 | Velev | H04W 4/005 370/331 |
| 2014/0036795 A1* | 2/2014 | Martinez Tarradell | H04W 76/048 370/329 |
| 2014/0036876 A1 | 2/2014 | Li et al. | |
| 2014/0185529 A1 | 7/2014 | Lim et al. | |
| 2014/0213186 A1 | 7/2014 | Gage et al. | |
| 2014/0213259 A1 | 7/2014 | Teyeb et al. | |
| 2014/0241260 A1 | 8/2014 | Schmidt et al. | |
| 2014/0335867 A1 | 11/2014 | Hsu et al. | |
| 2014/0370904 A1 | 12/2014 | Smith et al. | |
| 2015/0009883 A1 | 1/2015 | Bai et al. | |
| 2015/0016312 A1 | 1/2015 | Li et al. | |
| 2015/0043403 A1 | 2/2015 | Martinez Tarradell et al. | |
| 2015/0043445 A1 | 2/2015 | Xiong et al. | |
| 2015/0043448 A1 | 2/2015 | Chatterjee et al. | |
| 2015/0045016 A1 | 2/2015 | Xiong et al. | |
| 2015/0126196 A1 | 5/2015 | Lu et al. | |
| 2015/0163705 A1 | 6/2015 | Lu et al. | |
| 2015/0195831 A1* | 7/2015 | Du | H04W 74/004 370/329 |
| 2015/0257094 A1 | 9/2015 | Wei et al. | |
| 2015/0334693 A1 | 11/2015 | Lu et al. | |
| 2016/0192408 A1 | 6/2016 | Martinez et al. | |
| 2016/0302251 A1 | 10/2016 | Chatterjee et al. | |
| 2016/0337835 A1 | 11/2016 | Xiong et al. | |

FOREIGN PATENT DOCUMENTS

| | | |
|---|---|---|
| CN | 105359476 A | 2/2016 |
| CN | 105359606 A | 2/2016 |
| CN | 105359615 A | 2/2016 |
| CN | 105379316 A | 3/2016 |
| CN | 106060769 A | 10/2016 |
| CN | 106162533 A | 11/2016 |

(56) References Cited

FOREIGN PATENT DOCUMENTS

| | | |
|---|---|---|
| EP | 2509345 A1 | 10/2012 |
| JP | 2016527848 A | 9/2016 |
| KR | 102009010660 | 10/2009 |
| KR | 102011006876 | 6/2011 |
| KR | 1020110093642 A | 8/2011 |
| KR | 1020120031546 A | 4/2012 |
| KR | 1020120039605 A | 4/2012 |
| KR | 1020120070444 A | 6/2012 |
| KR | 1020120071676 A | 7/2012 |
| KR | 1020120137496 A | 12/2012 |
| KR | 102013000667 | 1/2013 |
| KR | 1020130035964 A | 4/2013 |
| KR | 1020160021188 A | 2/2016 |
| TW | 201410054 A | 3/2014 |
| TW | 201521505 A | 6/2015 |
| WO | WO-2011099821 A2 | 8/2011 |
| WO | WO-2011112051 A2 | 9/2011 |
| WO | WO-2011119680 A2 | 9/2011 |
| WO | WO-2012056209 A1 | 5/2012 |
| WO | WO-2012068731 A1 | 5/2012 |
| WO | WO-2012136311 A1 | 10/2012 |
| WO | WO-2012177002 A2 | 12/2012 |
| WO | WO-2013012759 A1 | 1/2013 |
| WO | WO-2013025057 A2 | 2/2013 |
| WO | WO-2013048193 A1 | 4/2013 |
| WO | WO-2014021987 A1 | 2/2014 |
| WO | WO-2014022776 A1 | 2/2014 |
| WO | WO-2014022797 A1 | 2/2014 |
| WO | WO-2015021267 A1 | 2/2015 |
| WO | WO-2015021276 A1 | 2/2015 |
| WO | WO-2015021284 A1 | 2/2015 |
| WO | WO-2015021315 A1 | 2/2015 |
| WO | WO-2015021317 A1 | 2/2015 |

OTHER PUBLICATIONS

"U.S. Appl. No. 14/126,983, Preliminary Amendment filed Dec. 17, 2013", 8 pgs.
"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.
"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.
"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); Radio Resource Control (RRC); Protocol specification", 3GPP TS 36.331 V11.2.0. Technical Specification Group Radio Access Network. Release 11., (Dec. 2012), 340 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.
"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.
"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.
"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.
"Evolved Universal Terrestrial Radio Access Network (E-UTRAN); S1 Application Protocol (S1AP)", 3GPP TS 36.413 V11.2.1. Technical Specification Group Radio Access Network. Release 11., (Feb. 2013), 272 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.
"International Application Serial No. PCT/US2013/044445, International Search Report mailed Sep. 16, 2013", 3 pgs.
"International Application Serial No. PCT/US2013/044445, Written Opinion mailed Sep. 16, 2013", 9 pgs.
"International Application Serial No. PCT/US2013/053428, International Search Report mailed Dec. 19, 2013", 4 pgs.
"International Application Serial No. PCT/US2013/053428, Written Opinion mailed Dec. 19, 2013", 8 pgs.
"International Application Serial No. PCT/US2013/053470, International Search Report mailed Nov. 21, 2013", 3 pgs.
"International Application Serial No. PCT/US2013/053470, Written Opinion mailed Nov. 21, 2013", 4 pgs.
"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.
"Machine-Type and other Mobile Data Applications Communications Enhancemetns", 3GPP TR 23.887 v1.1.0 Technical Specification Group Services and System Aspects (Release 12), (Sep. 2013), 153 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access Stratum (NAS) configuration Management Object (MO)", 3GPP TS 24.368 V11.2.0. Technical Specification Group Core Network and Terminals. Release 11., (Sep. 2012), 13 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Study on LTE Device to Device Proximity Services", 3GPP TSG Ran Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.
"Study on provision of low-Cost MTC UEs based on LTE", 3GPP TR 36.888 v2.1.1 Technical Specification Group Radio Access Network, Release 12, (Jun. 2013), 55 pgs.
"T5 based downlink small data transfer without establishing RRC security", CATT; 3GPP Draft: S2-122826 T5 Based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain (Jul. 2012), 3 pgs.
"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.
"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.
Andreev, S., et al., "Efficient small data access for machine-type communications in LTE", 2013 IEEE International Conference on Communications (ICC), (2013), 3569-3574.
Ericson, Juniper, et al., "Device triggering procedure", 3GPP TSG-CT WG3 Meeting #69. C3-120956., [Online] retrieved from the internet:<http://v9ww.3gpp.org/ftp/tsg_ct/WG3_interworking_ex-CN3/TSGC3_69JKyoto/Docs/>, (May 21, 2012), 4 pgs.

(56) References Cited

OTHER PUBLICATIONS

"U.S. Appl. No. 13/790,630, Final Office Action mailed Feb. 3, 2015", 16 pgs.
"U.S. Appl. No. 13/790,630, Non Final Office Action mailed Sep. 5, 2014", 17 pgs.
"U.S. Appl. No. 13/790,630, Notice of Allowance mailed Mar. 31, 2015", 7 pgs.
"U.S. Appl. No. 13/790,630, Response filed Jan. 5, 2015 to Non Final Office Action mailed Sep. 5, 2014", 9 pgs.
"U.S. Appl. No. 13/790,630, Response filed Mar. 17, 2015 to Final Office Action mailed Feb. 3, 2015", 10 pgs.
"U.S. Appl. No. 14/280,799, Non Final Office Action mailed Jul. 13, 2015", 34 pgs.
"U.S. Appl. No. 14/280,799, Notice of Allowance mailed Dec. 24, 2015", 8 pgs.
"U.S. Appl. No. 14/280,799, Response filed Aug. 27, 2015 to Non Final Office Action mailed Jul. 13, 2015", 11 pgs.
"U.S. Appl. No. 14/300,937, Non Final Office Action mailed Sep. 25, 2015", 12 pgs.
"U.S. Appl. No. 14/300,937, Response filed Dec. 22, 2015 to Non Final Office Action mailed Sep. 25, 2015", 13 pgs.
"U.S. Appl. No. 14/318,085, Non Final Office Action mailed Oct. 8, 2015", 14 pgs.
"Discussion of D2D discovery methods", R1-132068, 3GPP TSG RAN WG1 Meeting #73, (May 2013), 1-5.
"Discussion on design options for D2D discovery", R1-131924, 3GPP TSG RAN WG1 Meeting #73, (May 2013), 1-6.
"International Application Serial No. PCT/US2014/050128, International Search Report mailed Nov. 13, 2014", 8 pgs.
"International Application Serial No. PCT/US2014/050128, Invitation to Correct Defects mailed Aug. 14, 2014", 4 pgs.
"International Application Serial No. PCT/US2014/050128, Written Opinion mailed Nov. 13, 2014", 7 pgs.
"International Application Serial No. PCT/US2014/050147, International Search Report mailed Nov. 13, 2014", 3 pgs.
"International Application Serial No. PCT/US2014/050147, Written Opinion mailed Nov. 13, 2014", 6 pgs.
"International Application Serial No. PCT/US2014/050159, International Search Report mailed Nov. 18, 2014", 3 pgs.
"International Application Serial No. PCT/US2014/050159, Written Opinion mailed Nov. 18, 2014", 7 pgs.
"International Application Serial No. PCT/US2014/050207, International Search Report mailed Nov. 19, 2014", 3 pgs.
"International Application Serial No. PCT/US2014/050207, Written Opinion mailed Nov. 19, 2014", 6 pgs.
"International Application Serial No. PCT/US2014/050209, International Search Report mailed Nov. 27, 2014", 3 pgs.
"International Application Serial No. PCT/US2014/050209, Written Opinion mailed Nov. 27, 2014", 8 pgs.
"ProSe direct communication (D2D)", R1-132174, 3GPP TSG-RAN WG1 Meeting #73, Renesas Mobile Europe Ltd, (May 2013), 1-4.
"Taiwanese Application Serial No. 103125302, Office Action mailed Sep. 23, 2015", W/ English Translation, 7 pgs.
"Taiwanese Application Serial No. 103125302, Response filed Dec. 17, 2015 to Office Action mailed Sep. 23, 2015", w/ English Claims, 20 pgs.
"Techniques for D2D Discovery", R1-132503, 3GPP TSG RAN WG1 Meeting #73, (May 2013), 1-7.

Alcatel-Lucent, et al., "PRACH coverage extension for MTC devices", R1-130939, 3GPP TSG-RAN WG1 Meeting #72bis, Chicago, USA, [Online], Retrieved from the Internet: <URL: http://www.3gpp.org/ftp/tsg_ran/wg1_rl1/TSGRL_72b/Docs/>, (Apr. 15-19, 2013), 3 pgs.
Ericsson, et al., "D2D for LTE Proximity Services: Overview", 3GPP TSG-RAN WG1 #73, R1-132028, (May 2013), 6 pgs.
"U.S. Appl. No. 14/300,937, Final Office Action mailed Mar. 25, 2016", 11 pgs.
"U.S. Appl. No. 14/318,085, Response filed Mar. 7, 2016 to Non Final Office Action mailed Oct. 8, 2015", 13 pgs.
"International Application Serial No. PCT/US2014/050128, International Preliminary Report on Patentability mailed Feb. 18, 2016", 9 pgs.
"International Application Serial No. PCT/US2014/050147, International Preliminary Report on Patentability mailed Feb. 18, 2016", 8 pgs.
"International Application Serial No. PCT/US2014/050159, International Preliminary Report on Patentability mailed Feb. 18, 2016", 9 pgs.
"International Application Serial No. PCT/US2014/050207, International Preliminary Report on Patentability mailed Feb. 18, 2016", 8 pgs.
"International Application Serial No. T/US2014/050209, International Preliminary Report on Patentability mailed Feb. 19, 2016", 10 pgs.
"Chinese Application Serial No. 201480038461.6, Voluntary Amendment filed Jun. 17, 2016", w/ English Translation of Request form, 52 pgs.
"U.S. Appl. No. 14/300,937, Notice of Allowance mailed Jul. 15, 2016", 10 pgs.
"U.S. Appl. No. 14/314,957, Examiner Interview Summary mailed Jul. 19, 2016", 3 pgs.
"U.S. Appl. No. 14/314,957, Non Final Office Action mailed May 12, 2016", 32 pgs.
"U.S. Appl. No. 14/314,957, Response filed Jul. 13, 2016 to Non Final Office Action mailed May 12, 2016", 18 pgs.
"U.S. Appl. No. 14/318,085, Final Office Action mailed May 25, 2016", 15 pgs.
"U.S. Appl. No. 14/816,282, Non Final Office Action mailed Jun. 9, 2016", 11 pgs.
"U.S. Appl. No. 15/096,504, Preliminary Amendment filed Aug. 5, 2016", 7 pgs.
"U.S. Appl. No. 14/318,085, Notice of Allowability mailed Nov. 25, 2016", 2 pgs.
"U.S. Appl. No. 14/318,085, Notice of Allowance mailed Sep. 23, 2016", 12 pgs.
"U.S. Appl. No. 14/318,085, Response filed Aug. 25, 2016 to Final Office Action mailed May 25, 2016", 11 pgs.
"Korean Application Serial No. 10-2016-7000316, Office Action mailed Sep. 6, 2016", W/ English Translation, 9 pgs.
"Korean Application Serial No. 10-2016-7000316, Response filed Nov. 14, 2016 to Office Action mailed Sep. 6, 2016", W/ English Translation of Claims, 27 pgs.
"Korean Application Serial No. 2016-7000399, Office Action mailed Oct. 20, 2016", W/ English Translation, 9 pgs.
"European Application Serial No. 14834152.2, Extended European Search Report mailed Feb. 14, 2017", 7 pgs.

* cited by examiner

SIGNALING RADIO BEARER OPTIMIZATIONS AND OTHER TECHNIQUES FOR SUPPORTING SMALL DATA TRANSMISSIONS

CLAIM OF PRIORITY

This patent application claims the benefit of priority of U.S. Provisional Patent Application Ser. No. 61/863,902, entitled "Advanced Wireless Communication Systems and Techniques," filed on Aug. 8, 2013, which is hereby incorporated by reference herein in its entirety.

BACKGROUND

User Equipment (UE) that is used for Machine Type Communication (MTC) or MTC applications, such as a smart meter, have certain characteristics, such as being nomadic, having low mobility, having low priority data transmissions, or sending small amounts of Mobile Originated (MO) or Mobile Terminated (MT) data very infrequently. Given the wide array of possibilities of MTC applications and devices, it is expected that there will be trillions of Machine to Machine (M2M) communications with small data (SD) to transfer. Many solutions proposed for the transfer of SD today focus on re-using the signaling architecture. However, the various data generated by the M2M communications is in need of being transferred efficiently and using minimum power consumption from the UE in order to increase the life of the UE.

Figure 1:
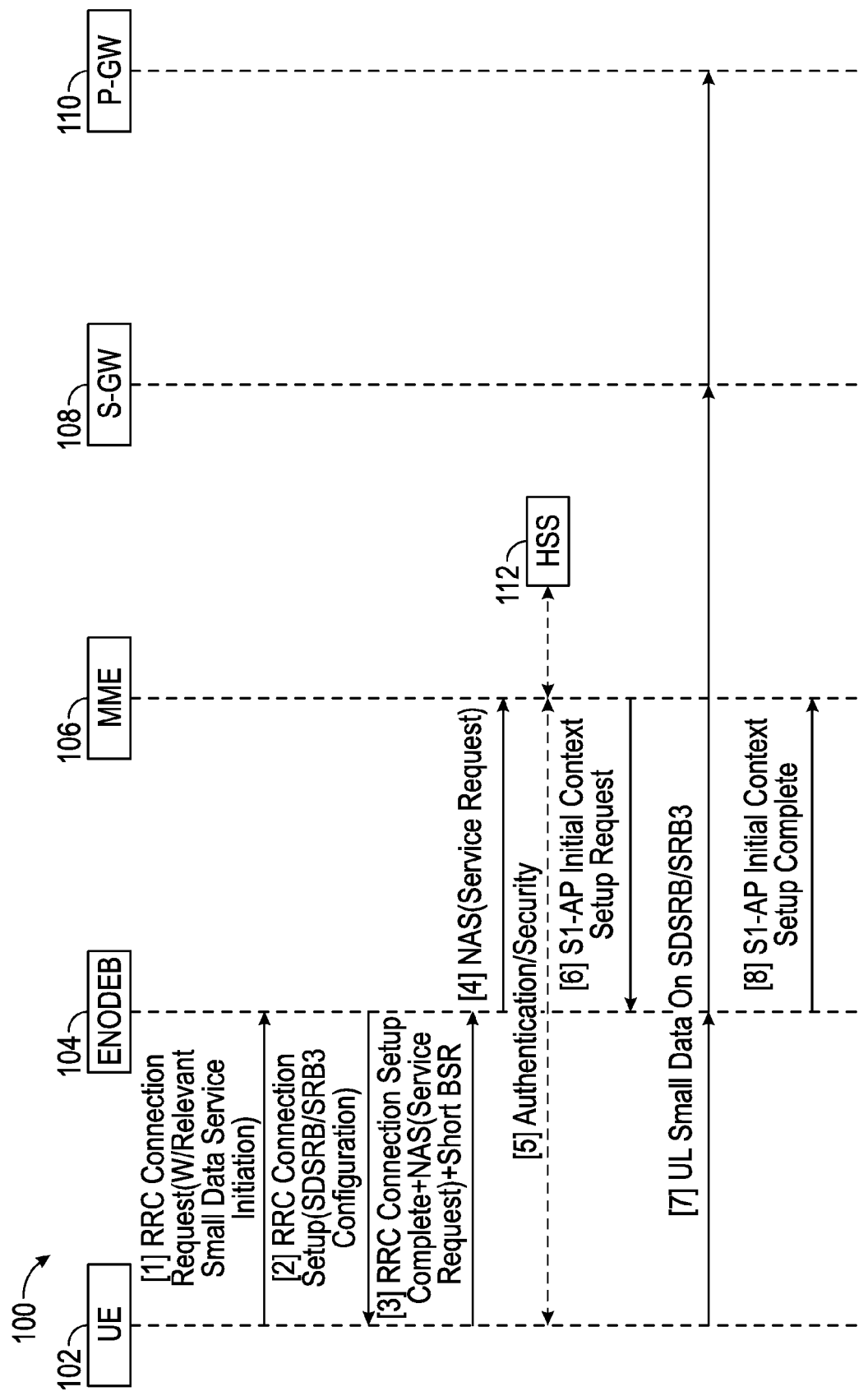
FIG. 1 illustrates generally a diagram showing small data signaling radio bearer (SDSRB) configurations for connection setup in accordance with some embodiments.

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Techniques to transfer Small Data (SD) effectively are desired. One technique to transfer SD disclosed herein includes using a signaling bearer on a control plane, such as a new small data signaling radio bearer (SDSRB). The SDSRB architecture can support sending SD transmissions over a radio access network (RAN) so that the SD can be treated in a different manner at the network, such as for scalability. For example, the SD can be sent in (non-access stratum) NAS signaling to avoid signaling overhead of creating or maintaining data radio bearers (DRB) when only SD is to be sent by the User Equipment (UE). SD can include data containing less than a specified number of bits or bytes. In an example, SD can include data that is less than 400 bits. In another example, SD can include data that is less than 800 bits or any other value of bits. In another example, SD can include data that is less than 1,024 bits. In another example, SD can include data that is in a range from 300 bits to 1,500 bits.

In an example, SD can be Machine Type Communication (MTC), Machine to Machine (M2M) data, or other data with a low priority. SD can be sent infrequently or accepting of long delays in transmission. MTC can include M2M data, data generated periodically and automatically without active user input, background data, configuration data, or the like.

The SDSRB can be a signaling radio bearer, such as SRB3, or a SRBn, where n is any number supported in a 3rd Generation partnership Project (3GPP) long term evolution (LTE) network. The SDSRB can be used to transfer SD generated by MTC, smartphone devices, tablet devices, applications, or the like. The SDSRB can be mapped to an existing Logical Channel Identification (LCID) field in an identity of the logical channel range. In an example, the SDSRB can be mapped to different LCIDs for a Downlink Shared Channel (DL-SCH), Uplink Shared Channel (UL-SCH), or Multicast Channel (MCH), such as an LCID field in a reserved range, for example, as can be defined in a technical specification similar to 3GPP Technical Specification 36.321 "Evolved Universal Terrestrial Radio Access (E-UTRA); Medium Access Control (MAC) protocol specification" (e.g., release version 12 or later).

In an example, the SDSRB for SD transmissions can be expressed according to the tables below, for example, as can be added to a technical specification similar to the 3GPP Technical Specification (TS) 36.331 "Evolved Universal Terrestrial Radio Access (E-UTRA); Radio Resource Control (RRC); Protocol specification", (e.g., release version 11 or later). For example, such a table may be provided in section 9.1.2.3 and 9.2.1.3 of TS 36.331. In addition to the three signaling radio bearers that currently exist in the TS 36.331, for example, a new SRB can be added, such as SDSRB, having the parameters shown in the tables below.

TABLE 1

SDSRB parameters in LTE as can be added to section 9.1.2.3 of TS 36.331

| Name | Value | Semantics description | Ver |
|---|---|---|---|
| RLC configuration | | | |
| logicalChannelIdentity | 3 | | |

TABLE 2

SDSRB parameters in LTE as can be added to section 9.2.1.3 of TS 36.331

| Name | Value | Semantics description | Ver |
|---|---|---|---|
| RLC configuration CHOICE ul-RLC-Config | am | | |
| >t-PollRetransmit | ms45 | | |
| >pollPDU | infinity | | |
| >pollByte | infinity | | |

TABLE 2-continued

SDSRB parameters in LTE as can be added
to section 9.2.1.3 of TS 36.331

| Name | Value | Semantics description | Ver |
|---|---|---|---|
| >maxRetxThreshold | t4 | | |
| dl-RLC-Config | | | |
| >t-Reordering | ms35 | | |
| >t-StatusProhibit | ms0 | | |
| Logical channel configuration | | | |
| priority | 4 | | |
| prioritisedBitRate | Variable (e.g. kBps256) | | |
| bucketSizeDuration | N/A | | |
| logicalChannelGroup | 0 | | |

In an example, the logicalChannelIdentity value in Table 1 can be a value other than 3, such as corresponding to another existing LCID field, an LCID reserved value, or the like. The SDSRB can be configured such that an evolved Node B (eNodeB) can perform resource allocation. In an example, the eNodeB can have control over the proliferation of SD expected in the near future, such as by suspending the SDSRB. An eNodeB can be a base station using the 3GPP framework. A UE can be a device such as a sensors, a smart phone, a tablet or the like using the 3GPP framework.

FIG. 1 illustrates generally a diagram showing small data signaling radio bearer (SDSRB) configurations in accordance with some embodiments. In an example, the SDSRB can be configured using a Radio Resource Control (RRC) connection setup as shown in FIG. 1. In an example, the SDSRB can be established during RRC connection establishment (e.g., RRC connection setup) when a SRB1 is established. The SDSRB establishment can be implicitly established by the eNodeB.

In an example, the SDSRB can be setup using an RRC connection request from a UE 102 to an eNodeB 104, such as by initiating relevant SD service. The eNodeB 104 can send an RRC connection setup configuration to the UE 102. The UE can then send an RRC connection setup complete and NAS service request and short Buffer Status Report (BSR) to the eNodeB 104. The eNodeB can send NAS service request to a Mobile Management Entity (MME) 106. In an example, the UE 102 can wait until an evolved universal terrestrial radio access network (E-UTRAN) sends a SecurityModeCommand message before using the SDSRB. If the UE 102 can wait until E-UTRAN sends a SecurityModeCommand message before using the SDSRB, integrity protection and ciphering can be established, such as by using an authentication/security step with the eNodeB 104, the MME 106 and a Home Subscriber Server (HHS) 112 in FIG. 1. The MME 106 can send an S1 application protocol (S1AP) initial context setup request to the eNodeB 104, which can allow the UE 102 to use the SDSRB. The UE 102 can send Uplink (UL) SD on SDSRB to the Serving gateway (S-GW) 108 and the Packet Data Network (PDN) gateway (P-GW) 110. The eNodeB 104 can then send S1AP initial context setup complete to the MME 106.

In an example, the UE 102 can use the SDSRB immediately after being configured without having AS security established, such as when the SecurityModeCommand messages have not been exchanged with the UE 102 or the eNodeB 104 or the E-UTRAN has not received the UE context information from the evolved packet core (EPC). If the UE 102 uses the SDSRB without having AS security established, the UE 102 can use security such as NAS security to encrypt a message. If no data radio bearers (DRB) are established, SDSRB can be established without configuring Access Stratum (AS) security.

Figure 2:
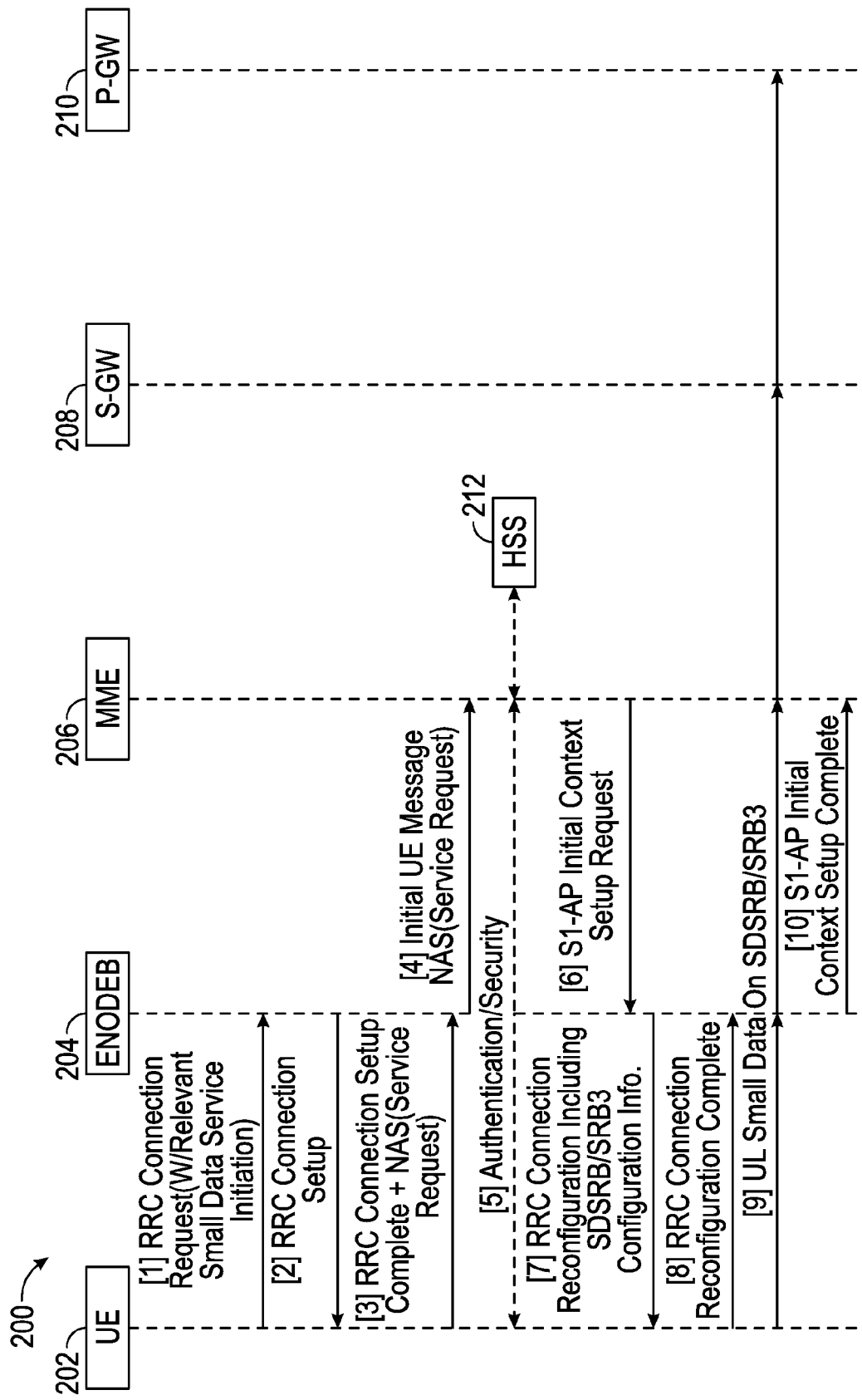
FIG. 2 illustrates generally a diagram showing small data signaling radio bearer (SDSRB) configurations for connection reconfiguration in accordance with some embodiments.

FIG. 2 illustrates generally a diagram showing small data signaling radio bearer (SDSRB) configurations in accordance with some embodiments. In an example, the SDSRB can be configured using an RRC connection reconfiguration as shown in FIG. 2. In an example, the SDSRB can be established during RRC connection reconfiguration exchange. The SDSRB can be configured using RRC connection reconfiguration when other applications are running on the device in addition to a SD application. If no data radio bearers (DRB) are established, SDSRB can be established without configuring AS security.

In an example, the SDSRB can be setup using an RRC connection request from a UE 202 to an eNodeB 204, such as by initiating a relevant SD service. The eNodeB 204 can send an RRC connection setup configuration to the UE 202. The UE can then send an RRC connection setup complete and NAS service request and short BSR to the eNodeB 204. The eNodeB can send initial UE message NAS service request to a MME 206. In an example, the UE 202 can wait until an E-UTRAN sends a SecurityModeCommand message before using the SDSRB. If the UE 202 can wait until E-UTRAN sends a SecurityModeCommand message before using the SDSRB, integrity protection and ciphering can be established, such as by using an authentication/security step with the eNodeB 204, the MME 206 and an HHS 212 in FIG. 2. The MME 206 can send an S1 application protocol (S1AP) initial context setup request to the eNodeB 204. The eNodeB 204 can send an RRC connection reconfiguration including SDSRB configuration information to the UE 202. The UE 202 can send RRC connection reconfiguration complete to the eNodeB 204. In an example, the UE 202 can send UL SD on SDSRB to a S-GW 208 and a P-GW 210. The eNodeB 204 can send a S1AP initial context setup complete to the MME 206.

In an example, short message service (SMS) can be transmitted over a SRB2. A UE that only has SD to send or receive can use the dedicated SDSRB and can avoid using the SRB2. In an example, the SDSRB can be used to deliver a background type of traffic. An operator can enforce using the SDSRB for this type of traffic or can charge a customer for use of another SRB or DRB. Using the SDSRB for this type of traffic can allow a network to remain available for higher priority traffic. In an example, advancements, such as a connected standby mode or a smart connect mode, can make it difficult to differentiate whether a UE is in a background mode or an active mode. By using SDSRB for this type of traffic, a network can perform more efficiently by sorting background type traffic from active traffic. The SDSRB can allow network operators to have control of how this type of data is sent.

In an example, the SDSRB can be configured for all types of Radio Link Control (RLC) modes, such as transparent mode (TM), unacknowledged mode (UM), or acknowledged mode (AM).

Figure 3:
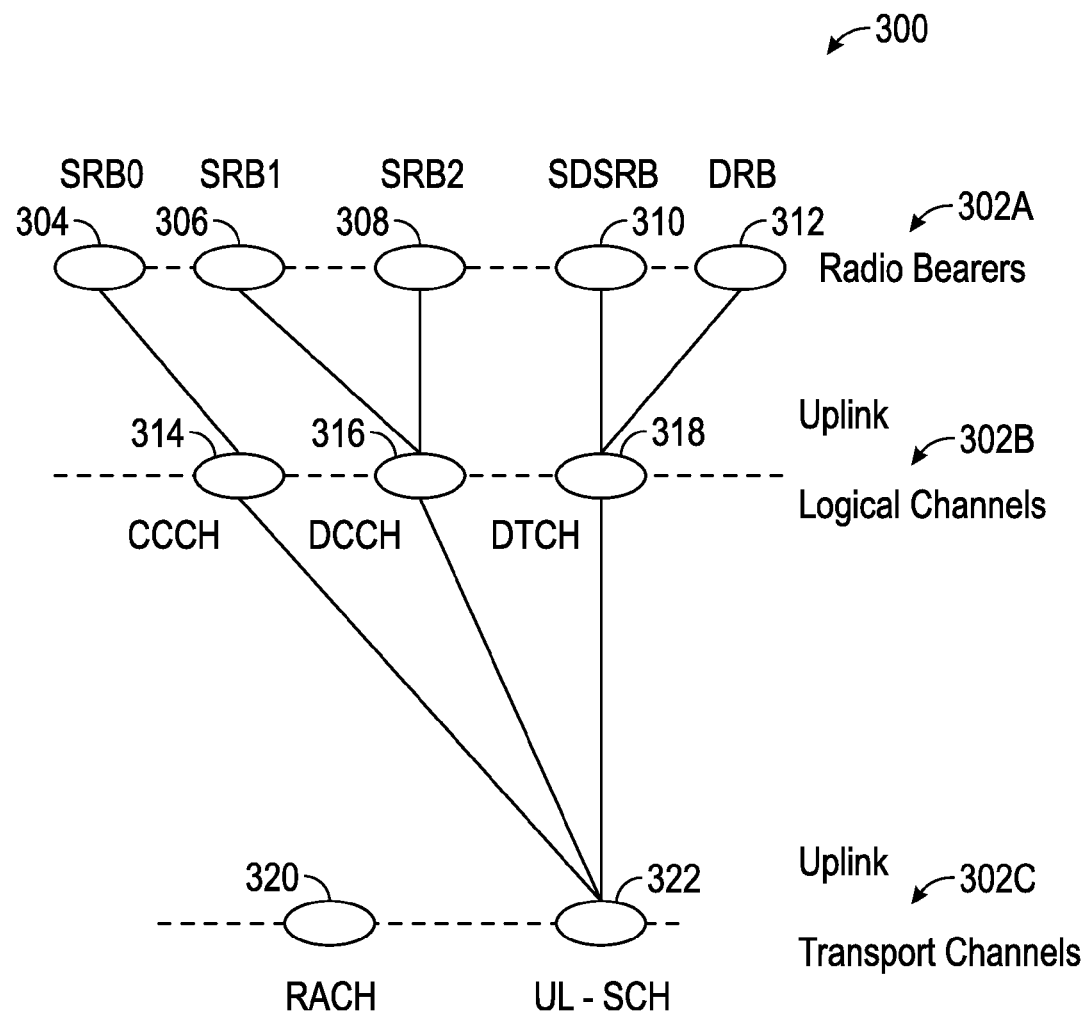
FIG. 3 illustrates generally a diagram of an Uplink (UL) channel map in accordance with some embodiments.

FIG. 3 illustrates generally a diagram of a UL channel map in accordance with some embodiments. The SDSRB can be a radio bearer on a radio bearer layer 302A. Other radio bearers on the radio bearer layer 302A can include a SRB0 304, a SRB1 306, a SRB2 308, or a DRB 312. The SRB0 can connect to a common control channel (CCCH) 314 on an UL logical channel layer 302B. The SRB1 or SRB2 can connect to a dedicated control channel (DCCH) 316 on an UL logical channel layer 302B. The SDSRB or DRB can connect to a dedicated traffic channel (DTCH) 318 on an UL logical channel layer 302B. The CCCH 314, the DCCH 316, or the DTCH 318 can connect to an UL-SCH 322 on an UL transport channel layer 302C. A random access procedure (RACH) 320 can also be on a UL transport channel layer 302C.

Figure 4:
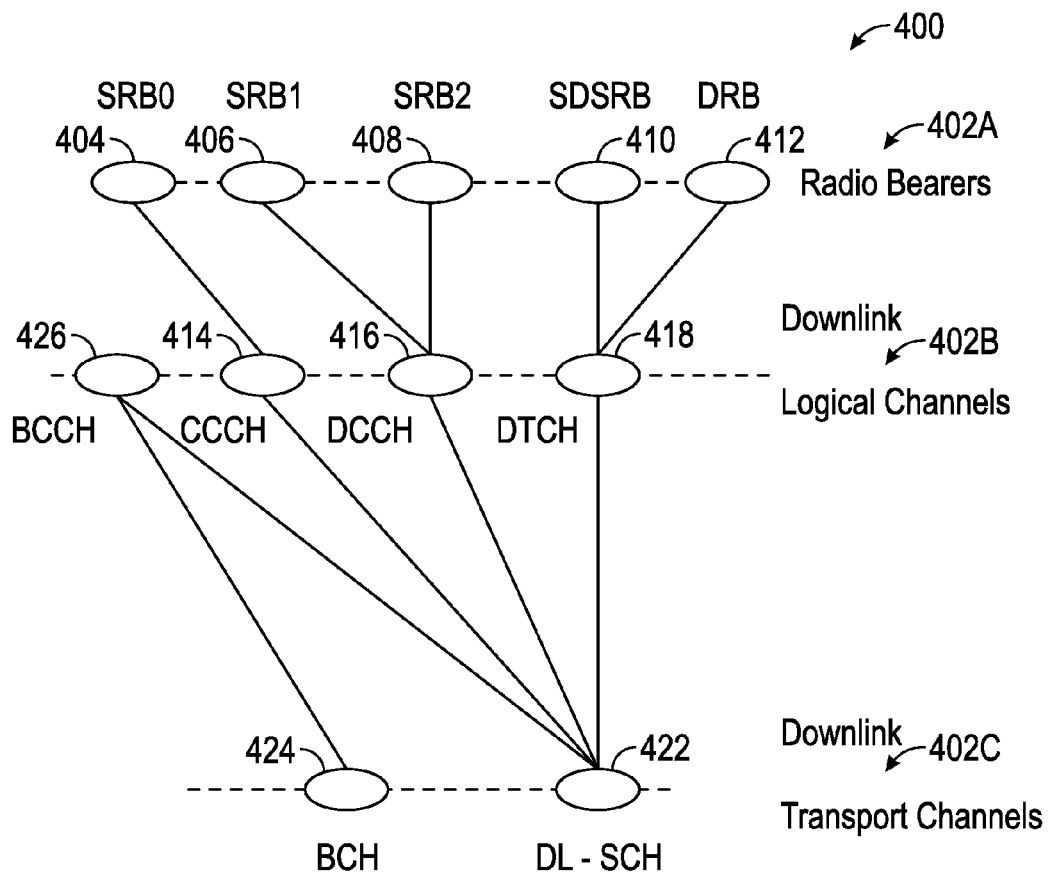
FIG. 4 illustrates generally a diagram of a Downlink (DL) channel map in accordance with some embodiments.

FIG. 4 illustrates generally a diagram of a DL channel map in accordance with some embodiments. The SDSRB can be a radio bearer on a radio bearer layer 402A. Other radio bearers on the radio bearer layer 402A can include a signaling radio bearer 0 SRB0 404, a SRB1 406, a SRB2 408, or a DRB 412. The SRB0 can connect to a common control channel (CCCH) 414 on a DL logical channel layer 402B. The SRB1 or SRB2 can connect to a dedicated control channel (DCCH) 416 on a DL logical channel layer 402B. The SDSRB or DRB can connect to a dedicated traffic channel (DTCH) 418 on a DL logical channel layer 402B. The CCCH 414, the DCCH 416, or the DTCH 418 can connect to a DL-SCH 422 on a DL transport channel layer 402C. A broadcast control channel (BCCH) 426 can be on a DL logical channel and can connect to the DL-SCH 422 or a broadcast channel (BCH) 424, which can be on a DL transport channel.

In an example, establishment cause values, such as RRC-ConnectionRequest can be used to establish the SDSRB such as using smallDataWithDelayTolerant, smallDataWithoutDelayTolerant, or smallDataOverSignaling. In an example, the UE can convey an indication, such as a new information element IE, as part of an RRCConnectionSetupComplete message that can establish the SDSRB.

Various techniques can be used to reduce MTC overload and congestion situations, such as configuring a UE as a low access priority (e.g., when a UE is only sending SD over SDSRB), extending wait timers to reject RRC connections, or using the MME to reject RRC connection establishments of a UE (e.g., when a UE is only sending SD over SDSRB).

In an example, SD can generate a large number of transitions between RRC states, such as changing between RRC_Connected and RRC_Idle modes. In an example, the UE or the MME can keep track of information associated with the frequency of the transitions between RRC states. The UE or the MME can send the information to the eNodeB. The eNodeB can adjust a configuration, such as an RRC inactivity timer, which can allow for better service to be provided to the UE. The information associated with the frequency of the transitions can include a number of RRC state transitions or a qualitative value related to RRC state transitions, such as low, medium, or high, which the UE can indicate when a RRC state transition counter is above a specified threshold. The specified threshold or other information can be determined or defined by the eNodeB, the UE, a manufacturer of the UE, the network, or the like. In order to convey the information from the UE to the network, the UE can send a new or existing UE assistance type of message, a new or existing RRC message (e.g., RRC connection setup complete or RRC connection reconfiguration complete), or the UE can use NAS PDU container (e.g., the information can be sent to the MME and the MEM can convey the information to E-UTRAN).

Figure 5:
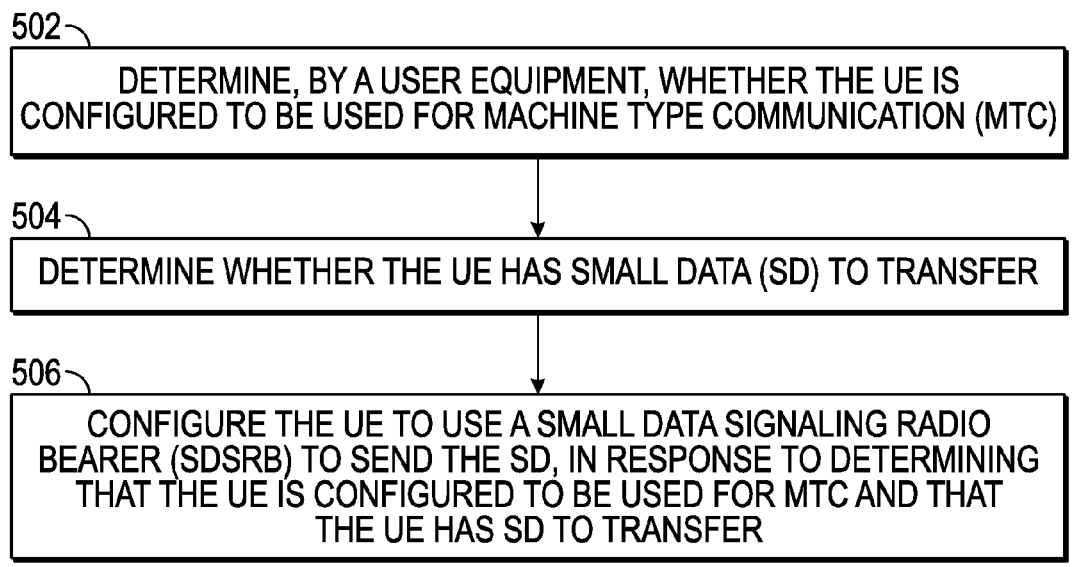
FIG. 5 illustrates generally a technique, such as a method, that can include configuring a User Equipment (UE) to use a small data signaling radio bearer (SDSRB) in accordance with some embodiments.

FIG. 5 illustrates generally a technique, such as a method, that can include determining, by a UE, whether the UE is configured to be used for MTC 502, determining whether the UE has SD to transfer 504, and configuring the UE to use a SDSRB to send the SD, in response to determining that the UE is configured to be used for MTC and that the UE has SD to transfer 506 in accordance with some embodiments. In another example, a technique can include determining, by an evolved Node B (eNodeB) whether the UE is configured to be used for MTC, determining whether there is SD to transfer to the UE, wherein SD comprises data that has delay tolerance, and configuring the UE to use a signaling bearer on a control plane to send the SD. These techniques can include configuring the UE to use an existing LCID for the SDSRB or a reserved range value of a LCID for the SDSRB. The techniques can also include configuring the SDSRB using RRC connection establishment or RRC connection reconfiguration. In an example, the techniques can include the UE sending information about RRC state transitions to the eNodeB.

Figure 6:
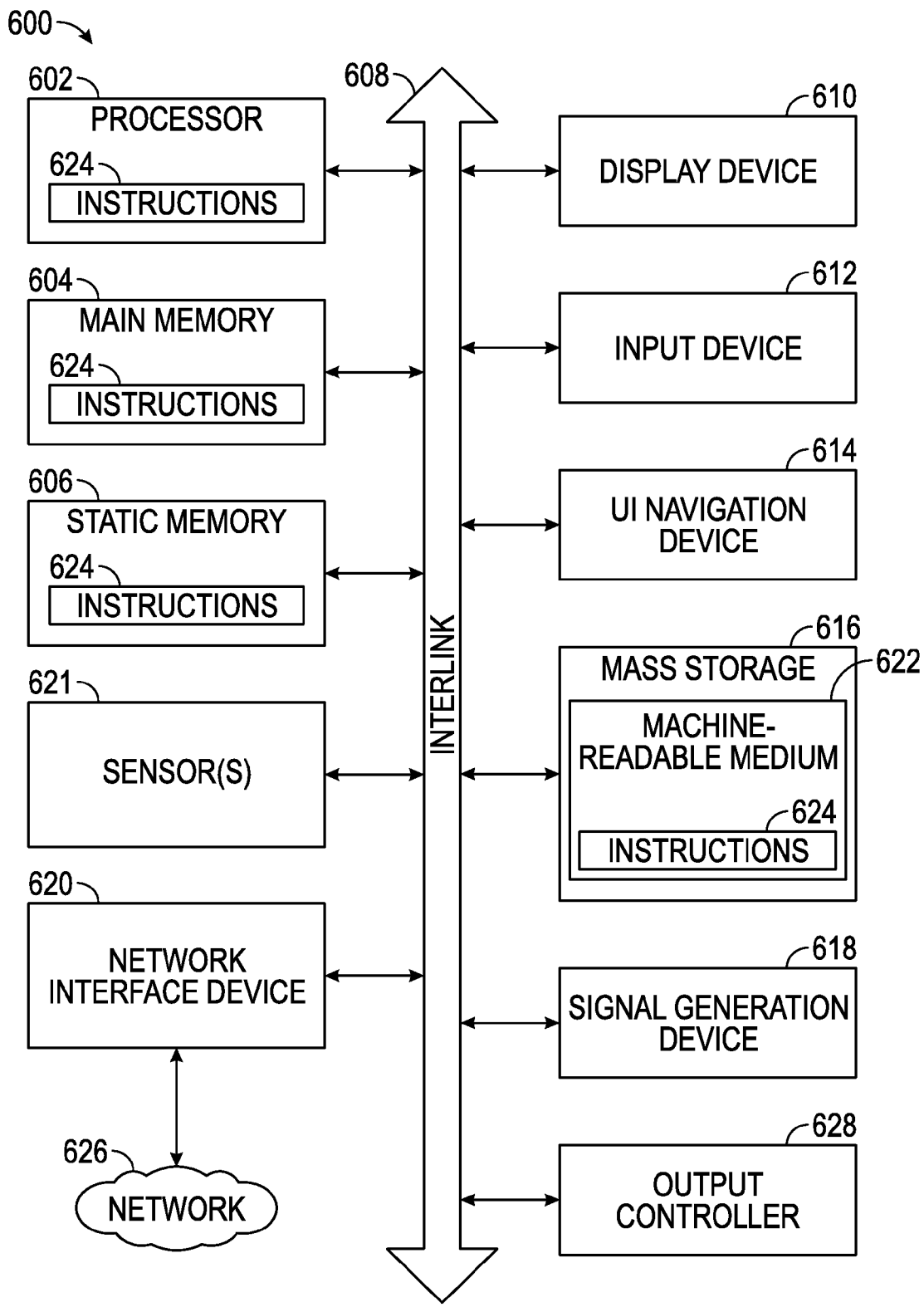
FIG. 6 illustrates generally an example of a block diagram of a machine upon which one or more embodiments can be implemented in accordance with some embodiments.

FIG. 6 illustrates generally an example of a block diagram of a machine 600 upon which any one or more of the techniques (e.g., methodologies) discussed herein can perform in accordance with some embodiments. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 600 can include a hardware processor 602 (e.g., a central processing unit (CPU), a graphics processing unit (GPU), a hardware processor core, or any combination thereof), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 can be a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 that is non-transitory on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Additional examples of the presently described method, system, and device embodiments are suggested according to the structures and techniques described herein. Other non-limiting examples can be configured to operate separately, or can be combined in any permutation or combination with any one or more of the other examples provided above or throughout the present disclosure.

Example 1 includes the subject matter embodied by an evolved Node B (eNodeB) comprising: hardware processing circuitry configured to process a notification that a User Equipment (UE) is configured to be used for Machine Type Communication (MTC), determine whether there is small data (SD) to transfer to the UE, and configure the UE to use a signaling bearer on a control plane to send the SD, in response to determining that the UE is configured to be used for MTC and that there is SD to transfer to the UE.

In Example 2, the subject matter of Example 1 can optionally include wherein the signaling bearer is a small data signaling radio bearer (SDSRB).

In Example 3, the subject matter of one or any combination of Examples 1-2 can optionally include wherein operations to configure the UE to use the SDSRB include operations to select a value of a Logical Channel Identification (LCID) field in an identity of the logical channel range.

In Example 4, the subject matter of one or any combination of Examples 1-3 can optionally include wherein operations to configure the UE to use the SDSRB include operations to select a value of a Logical Channel Identification (LCID) field in a reserved range.

In Example 5, the subject matter of one or any combination of Examples 1-4 can optionally include wherein the SDSRB comprises a first Logical Channel Identification (LCID) for Downlink Shared Channel (DL-SCH) and a second LCID for Uplink Shared Channel (UL-SCH).

In Example 6, the subject matter of one or any combination of Examples 1-5 can optionally include operations to configure the SDSRB using Radio Resource Control (RRC) connection establishment.

In Example 7, the subject matter of one or any combination of Examples 1-6 can optionally include wherein operations to configure the SDSRB include using a new value in RRCConnnectionRequest, wherein the new value specifies that the SD has delay tolerance.

In Example 8, the subject matter of one or any combination of Examples 1-7 can optionally include operations to configure the SDSRB using Radio Resource Control (RRC) connection reconfiguration.

In Example 9, the subject matter of one or any combination of Examples 1-8 can optionally include wherein the SDSRB is connected to a dedicated traffic channel (DTCH).

In Example 10, the subject matter of one or any combination of Examples 1-9 can optionally include operations to transfer SD to the UE using the SDSRB.

In Example 11, the subject matter of one or any combination of Examples 1-10 can optionally include wherein the SD is sent after Access Stratum (AS) security is established.

In Example 12, the subject matter of one or any combination of Examples 1-11 can optionally include wherein the SD is data that is less than 1,024 bits.

In Example 13, the subject matter of one or any combination of Examples 1-12 can optionally include wherein the SD has delay tolerance.

Example 14 can include, or can optionally be combined with all or portions of the subject matter of one or any combination of Examples 1-13 to include the subject matter embodied by at least one machine-readable medium including instructions for operation of a computing system, which when executed by a machine, cause the machine to perform operations including: determine, by an eNodeB, whether a User Equipment (UE) is configured to be used for a Machine Type Communication (MTC), determine whether there is small data (SD) to transfer to the UE, wherein SD includes data that has delay tolerance, and configure the UE to use a signaling bearer on a control plane to send the SD, in response to determining that the UE is configured to be used for MTC and that there is SD to transfer to the UE.

In Example 15, the subject matter of Example 14 can optionally include the wherein the signaling bearer is a small data signaling radio bearer (SDSRB).

In Example 16, the subject matter of one or any combination of Examples 14-15 can optionally include wherein operations to configure the UE to use the SDSRB comprises operations to select a value of a Logical Channel Identification (LCID) field in an identity of a logical channel range or a reserved range.

Example 17 can include, or can optionally be combined with all or portions of the subject matter of one or any combination of Examples 1-16 to include the subject matter embodied by User Equipment (UE) including: a transceiver configured to transmit and receive a Machine Type Communication (MTC), and a processor, coupled to the transceiver, arranged to: determine whether the UE has small data (SD) to transfer, and configure the UE to use a small data signaling radio bearer (SDSRB) to send the SD, in response to determining that the UE has SD to transfer.

In Example 18, the subject matter of Example 17 can optionally include the wherein the signaling bearer is a small data signaling radio bearer (SDSRB).

In Example 19, the subject matter of one or any combination of Examples 17-18 can optionally include wherein operations to configure the UE to use the SDSRB include operations to select a value of a Logical Channel Identification (LCID) field in an identity of the logical channel range or a reserved range.

Example 20 can include, or can optionally be combined with all or portions of the subject matter of one or any combination of Examples 1-19 to include the subject matter embodied by a method performed by circuitry of a User Equipment (UE) including: determining, by the UE, whether the UE is configured to be used for Machine Type Communication (MTC), determining whether the UE has small data (SD) to transmit, wherein SD includes data that has delay tolerance, and configuring the UE to use a signaling bearer on a control plane to send the SD, in response to determining that the UE is configured to be used for MTC and that the UE has SD to transfer.

In Example 21, the subject matter of Example 20 can optionally include the wherein the signaling bearer is a small data signaling radio bearer (SDSRB).

In Example 22, the subject matter of one or any combination of Examples 20-21 can optionally include wherein configuring the UE to use the signaling bearer comprises selecting a value of a Logical Channel Identification (LCID) field in an identity of the logical channel range or in a reserved range.

In Example 23, the subject matter of one or any combination of Examples 20-22 can optionally include configuring the signaling bearer using Radio Resource Control (RRC) connection establishment, wherein the configuring includes sending an indication to an evolved Node B (eNodeB) that the SD to transfer has delay tolerance.

In Example 24, the subject matter of one or any combination of Examples 20-23 can optionally include sending information about Radio Resource Control (RRC) state transitions to an evolved Node B (eNodeB).

In Example 25, the subject matter of one or any combination of Examples 20-24 can optionally include wherein a transmission that results in configuring the UE occurs over a wireless communications network operating in accordance with a standard from a 3rd Generation Partnership Project (3GPP) long term evolution (LTE) standards family.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The following claims are hereby incorporated into the detailed description, with each claim standing on its own as a separate embodiment.

What is claimed is:

1. An evolved Node B (eNodeB) comprising:
hardware processing circuitry comprising processor coupled with memory and configured to:
process a notification that a User Equipment (UE) is configured to be used for Machine Type Communication (MTC);
determine whether there is small data (SD) to transfer to the UE; and
configure the UE to use a small data signaling radio bearer (SDSRB), on a control plane to receive the SD, in response to determining that the UE is configured to be used for MTC and that there is SD to transfer to the UE, wherein the SDSRB on the control plane uses non-access stratum (NAS) signaling to send the SD, wherein the SDSRB is a signaling radio bearer other than signaling radio bearers (SRB) SRB0, SRB1, SRB2 and other than a data signaling radio bearer;
wherein the SDSRB is configured for highly delay tolerant data that is less than 1024 bits.

2. The eNodeB of claim 1, wherein operations to configure the UE to use the SDSRB include operations to select a value of a Logical Channel Identification (LCID) field in an identity of the logical channel range.

3. The eNodeB of claim 1, wherein operations to configure the UE to use the SDSRB include operations to select a value of a Logical Channel Identification (LCID) field in a reserved range.

4. The eNodeB of claim 1, wherein the SDSRB comprises a first Logical Channel Identification (LCID) for Downlink Shared Channel (DL-SCH) and a second LCID for Uplink Shared Channel (UL-SCH).

5. The eNodeB of claim 1 further comprising, operations to configure the SDSRB using Radio Resource Control (RRC) connection establishment.

6. The eNodeB of claim 5, wherein operations to configure the SDSRB include using a new value in RRCConnnectionRequest, wherein the new value specifies that the SD has delay tolerance.

7. The eNodeB of claim 1 further comprising, operations to configure the SDSRB using Radio Resource Control (RRC) connection reconfiguration.

8. The eNodeB of claim 1 wherein the SDSRB is connected to a dedicated traffic channel (DTCH).

9. The eNodeB of claim 1 further comprising, operations to transfer SD to the UE using the SDSRB.

10. The eNodeB of claim 9, wherein the SD is sent after Access Stratum (AS) security is established.

11. The eNodeB of claim 1, wherein the SD is data that is less than 1,024 bits.

12. The eNodeB of claim 1, wherein the hardware processing circuitry to configure the UE to use the SDSRB comprises configuring the SDSRB for one of a radio link control (RLC) transparent mode.

13. At least one non-transitory machine-readable medium including instructions for operation of a computing system, which when executed by a machine, cause the machine to perform operations comprising:
determine, by an eNodeB, whether a User Equipment (UE) is configured to be used for a Machine Type Communication (MTC);
determine whether there is small data (SD) to transfer to the UE, wherein SD includes data that has delay tolerance; and
configure the UE to use a small data signaling radio bearer (SDSRB), on a control plane to receive the SD, in response to determining that the UE is configured to be used for MTC and that there is SD to transfer to the UE, wherein the SDSRB on the control plane uses non-access stratum (NAS) signaling to send the SD, wherein the SDSRB is a signaling radio bearer other than signaling bearers (SRB) SRB0, SRB1, SRB2 and other than a data signaling radio bearer;
wherein the SDSRB is configured for highly delay tolerant data that is less than 1024 bits.

14. The at least one non-transitory machine-readable medium of claim 13, wherein operations to configure the UE to use the SDSRB comprises operations to select a value of a Logical Channel Identification (LCID) field in an identity of a logical channel range or a reserved range.

15. The at least one non-transitory machine-readable medium of claim 13, wherein operations to configure the UE to use the SDSRB comprises configuring the SDSRB for one of a radio link control (RLC) unacknowledged mode.

16. User Equipment (UE) comprising:
a transceiver configured to transmit and receive a Machine Type Communication (MTC); and
a processor, coupled to the transceiver, arranged to:
determine whether the UE has small data (SD) to transfer; and
configure the UE to use a small data signaling radio bearer (SDSRB) on a control plane to send the SD, in response to determining that the UE has SD to transfer, wherein configuration of the UE to use the SDSRB to send the SD includes selection of a value of a Logical Channel Identification (LCID) field in an identity of the logical channel range or a reserved range, wherein the SDSRB on the control plane is established using Radio Resource Control (RRC) connection establishment, wherein the SDSRB is a signaling radio bearer other than signaling radio bearers SRB0, SRB 1, SRB2 and other than a data signaling radio bearer;

wherein the SDSRB is configured for highly delay tolerant data that is less than 1024 bits.

17. The UE of claim 16, wherein the processor arranged to configure the UE to use the SDSRB comprises configuring UE to use the SDSRB in one of a radio link control (RLC) unacknowledged mode.

18. A method performed by circuitry of a User Equipment (UE) comprising:

determining, by the UE, whether the UE is configured to be used for Machine Type Communication (MTC);

determining whether the UE has small data (SD) to transmit, wherein SD includes data that has delay tolerance; and configuring a small data signaling radio bearer (SDSRB) on a control plane using Radio Resource Control (RRC) connection establishment, wherein the SDSRB is a signaling radio bearer other than signaling radio bearers SRB0, SRB 1, SRB2 and other than a data signaling radio bearer; and configuring the UE to use the SDSRB to send the SD, in response to determining that the UE is configured to be used for MTC and that the UE has SD to transfer, wherein configuring the UE to use the SDSRB to send the SD includes selecting a value of a Logical Channel Identification (LCID) field in an identity of the logical channel range or a reserved range;

wherein the SDSRB is configured for highly delay tolerant data that is less than 1024 bits.

19. The method of claim 18, wherein the configuring of the UE to use the SDSRB includes sending an indication to an evolved Node B (eNodeB) that the SD to transfer has delay tolerance.

20. The method of claim 18 further comprising, sending information about Radio Resource Control (RRC) state transitions to an evolved Node B (eNodeB).

21. The method of claim 18, wherein a transmission that results in configuring the UE occurs over a wireless communications network operating in accordance with a standard from a 3rd Generation Partnership Project (3GPP) long term evolution (LTE) standards family.

22. The method of claim 18, wherein configuring the UE to use the SDSRB comprises configuring UE to use the SDSRB in a radio link control (RLC) transparent mode.

* * * * *

UNITED STATES PATENT AND TRADEMARK OFFICE
CERTIFICATE OF CORRECTION

PATENT NO. : 9,681,354 B2
APPLICATION NO. : 14/318008
DATED : June 13, 2017
INVENTOR(S) : Bangolae et al.

Page 1 of 1

It is certified that error appears in the above-identified patent and that said Letters Patent is hereby corrected as shown below:

On the Title Page

On page 3, in Column 1, under "Foreign Patent Documents", Line 3, delete "102009010660" and insert --1020090106603 A-- therefor On page 3, in Column 1, under "Foreign Patent Documents", Line 4, delete "102011006876" and insert --1020110068768 A-- therefor On page 3, in Column 1, under "Foreign Patent Documents", Line 11, delete "102013000667" and insert --1020130006673 A-- therefor On page 3, in Column 1, under "Other Publications", Line 30, delete "(E-UTRS)" and insert --(E-UTRA)-- therefor On page 3, in Column 1, under "Other Publications", Line 34, delete "(E_UTRA);" and insert --(E-UTRA);-- therefor On page 3, in Column 2, under "Other Publications", Line 30, delete "Enhancemetns"," and insert --Enhancements",-- therefor On page 4, in Column 2, under "Other Publications", Line 24, delete "T/US2014/050209," and insert --PCT/US2014/050209,-- therefor In the Claims In Column 12, Line 9-10, in Claim 6, delete "RRCConnnectionRequest," and insert --RRCConnectionRequest,-- therefor Signed and Sealed this
Sixteenth Day of July, 2019

Andrei Iancu
*Director of the United States Patent and Trademark Office*